United States Patent [19]

Karlsson

[11] Patent Number: 4,564,742
[45] Date of Patent: Jan. 14, 1986

[54] SOURCE OF POWER FOR ARC WELDING
[75] Inventor: Rolf L. Karlsson, Laxå, Sweden
[73] Assignee: ESAB Aktiebolag, Sweden
[21] Appl. No.: 672,720
[22] Filed: Nov. 19, 1984
[30] Foreign Application Priority Data
Nov. 28, 1983 [SE] Sweden ............................. 8306550
[51] Int. Cl.[4] .............................................. B23K 9/10
[52] U.S. Cl. ............................ 219/130.1; 219/130.33; 219/137 PS; 363/71
[58] Field of Search ........... 219/130.1, 130.31, 130.32, 219/130.33, 137 PS, 130.21; 363/17, 71

[56] References Cited
U.S. PATENT DOCUMENTS 3,728,516  4/1973  Daspit .......................... 219/130.33
4,062,057 12/1977  Perkins et al. ...................... 363/71
4,276,590  6/1981  Hansel et al. ....................... 363/71
4,503,316  3/1985  Murase et al. ................. 219/130.32

Primary Examiner—Clifford C. Shaw
Attorney, Agent, or Firm—Lerner, David, Littenberg, Krumholz & Mentlik

[57] ABSTRACT

Power sources for welding applications and the like are provided in accordance with the teachings of the present invention. An inverter arrangement comprising a plurality of inverters, having inputs connected in series, receive portions of a d.c. load from a plurality of series connected smoothing capacitors. The smoothing capacitors are connected to form a voltage divider and apply the resulting portions of the d.c. load to the plurality of inverters. This enables the plurality of inverters to be dimensioned in a manner so as to withstand the smaller portions of the d.c. load resulting from the voltage division.

9 Claims, 2 Drawing Figures

SOURCE OF POWER FOR ARC WELDING

BACKGROUND OF THE INVENTION

The present invention relates to power supplies for arc welding equipment and more particularly to power sources having a rectifier connectable to a.c. mains to provide a d.c. output which is connected to a smoothing capacitor arrangement and a parallely disposed inverter arrangement for converting the d.c. voltage to an a.c. voltage having a frequency considerably higher than that of the a.c. mains. The inverter arrangement is provided with controlled semiconductor elements and with a transformer providing for the galvanic separation of the input of the inverter arrangement from its output which may then be connected to a welding station consisting of a workpiece and a welding electrode.

Sources of power for welding are usually equipped with a transformer for reducing the mains voltage to a lower welding voltage. Thanks to the substantially higher frequency of the welding voltage it is often possible to make this transformer much lighter than would be necessary to accommodate the mains frequency. The expression substantially higher frequency is used in this context to denote frequencies of at least 0.5 KHz. It is particularly desirable to select frequencies which are above an audible range, i.e., higher than approximately 15 KHz. When compared to the mains frequency, the higher frequency permits a more rapid control of welding parameters such as welding current and voltage. Sources of power of this type have previously been disclosed in, for example, U.S. Pat. No. 4,159,409 and UK Patent Specification No. GB 2,046,535.

However, the use of higher frequencies also involves certain disadvantages. The controllable semiconductor elements needed for higher frequencies and for the high outputs required in welding applications are expensive and perform less well in certain respects than corresponding semiconductor elements usable at the frequency of the a.c. main. For instance, as a general rule these semiconductor elements exhibit poorer characteristics in relation to overloading by transient phenomena such as rapid variations in current and voltage. Further, such semiconductor elements are particularly expensive if the same are required to be capable of accepting voltage loads of the same level as normally present in a.c. mains. For example, for a mains voltage of 380 V, the smoothed rectified d.c. voltage normally exceeds 530 V. Thus, when dimensioning the semiconductor elements allowance must be made for, amongst other things, variations in the mains voltage and the presence of transient phenomena. Accordingly, when designing for a normal mains voltage of 380 V, the dielectric strength of the semiconductor element selected should be at least 600 V, while at least 800 V must be provided when a mains voltage of 500 V is being considered.

The relatively high cost of semiconductor elements exhibiting sufficiently high dielectric strength for use in power sources for welding equipment is significant, particularly in the case of smaller power sources which are manufactured in large numbers. Thus, in such smaller power sources, the cost of the semiconductor element represents a considerable proportion of the total price, especially where high voltages are involved. The use of cheaper components having lower dielectric strength is consequently particularly desirable. However, while continued development is likely to result in lower prices for such semiconductor elements, it is unlikely that any great effect on the relationship between the prices of semiconductor components which offer low dielectric strength and high dielectric strength will result.

SUMMARY OF THE INVENTION

In order to achieve power supplies for welding applications which could employ semiconductive switching elements having low dielectric strength, and hence, would be lower in cost to manufacture, the inventor herein developed an inverter arrangement in accordance with one aspect of the present invention wherein each of a plurality of inverters receive only a portion of a shaped voltage load from a rectifier connected to an a.c. main. This permitted semiconductor elements having relatively low dielectric strength to be employed, markedly reducing the cost of the resulting power supply.

In accordance with the teachings of the present invention, power sources for welding applications and the like are provided wherein an inverter arrangement comprising a plurality of inverters, having inputs connected in series, receive portions, preferably even portions, of a d.c. load from a plurality of series connected smoothing capacitors which are connected to form a voltage divider and apply said portions of said d.c. load to said plurality of inverters enabling the plurality of inverters to be dimensioned in a manner so as to only withstand said portions of said d.c. load.

However an even distribution of the d.c. voltage may be disturbed during no-load conditions of the power source by the occurrence of markedly different magnetizing currents in the inverter transformers as well as due to the presence of markedly different leakage currents associated with the capacitors. Therefore, in accordance with another aspect of the present invention, it was found that if each series connected capacitor employed for smoothing was connected in parallel with a resistance an uneven partial voltage caused by said different magnetizing currents as well as said leakage currents can be avoided together with attendant overloads in particular ones of the plurality of inverters.

It has also been found that when a plurality of inverters are connected to a common welding inductor, an imbalance present in control pulses employed to govern the switching of each of the plurality of inverters will result in instability of the potential at the common output of the inverters. This can cause the voltage of one inverter to be excessive with respect to the voltage rating or dielectric strength of its semiconductor element. It has been determined that this form of instability and the resulting overloading of the semiconductive element within the inverter associated therewith can be avoided if outputs from each of the plurality of inverters are connected in series to an individual welding inductor.

Consequently, in accordance with yet another aspect of the present invention, an embodiment of a power source employing a plurality of inverters which are series connected is provided. The control devices for the plurality of inverters are disposed to control the semiconductive elements within the inverters in a manner to produce inverted voltage pulses at the outputs from the inverter transformers. Each inverter transformer, together with its series connected rectifier welding inductor and a free-wheeling diode which interacts with the welding inductor, are connected in parallel with one another and are connected to the welding station.

Therefore, it is a principal object of the present invention to provide power sources for welding applications which utilize an inverter arrangement employing a plurality of inverters receiving only a portion of a voltage load whereby semiconductive elements having relatively low dielectric strength may be relied upon to reduce the manufacturing costs associated therewith. Various other objects and advantages of the present invention will become clear from the following detailed description of an exemplary embodiment thereof and the novel features will be particularly pointed out in conjunction with the claims appended hereto.

BRIEF DESCRIPTION OF THE DRAWINGS

The invention will be more clearly understood by reference to the following detailed description of an exemplary embodiment thereof in conjunction with the accompanying drawings in which.

DETAILED DESCRIPTION

Figure 1:
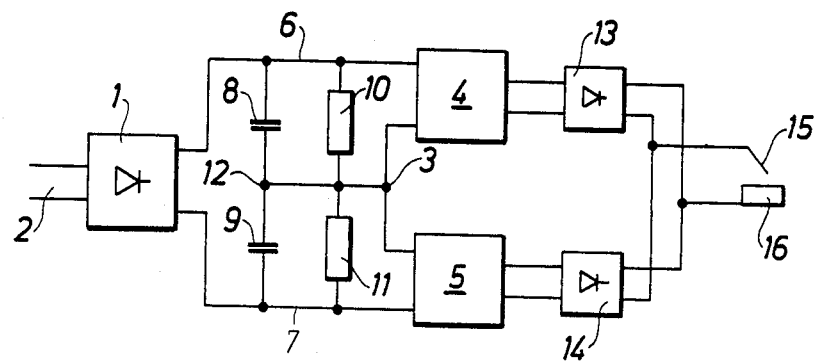
FIG. 1 is a block diagram schematically illustrating an exemplary embodiment of a power source according to the present invention.

Referring now to the drawings, and more particularly to FIG. 1 thereof, there is shown a block diagram schematically illustrating an exemplary power source according to the present invention. The embodiment of the power source shown in FIG. 1 comprises a rectifier 1, inverters 4 and 5, smoothing capacitors 8 and 9 and rectifiers 13 and 14. The rectifier 1 is connected to a single-phase a.c. mains supply 2. A pair of conventional inverters 4 and 5, connected in series by means of a cable 3, are connected to the output of rectifier 1 by means of cables 6 and 7.

The inverters 4 and 5 include controllable semiconductor elements in a manner well known to those of ordinary skill in the art. These may take the form of thyristors or transistors.

The two series connected smoothing capacitors 8 and 9 have resistances 10 and 11 connected in parallel with them and are connected across the cables 6 and 7. This will cause the d.c. output of rectifier 1 to divide as a function of the values of resistance 10 and 11. The center or junction 12 between the series connected capacitors 8 and 9 is connected to the cable 3.

The a.c. voltage generated by the inverters 4 and 5 preferably has a frequency of 15 KHz or above. This a.c. voltage is rectified in the appropriate rectifier 13 or 14 which is connected respectively to the output of each inverter 4 and 5, and thereafter is supplied to a welding station consisting of an electrode 15 and workpiece 16. Because of the voltage division between the two resistances 10 and 11, which may have identical resistivity, the voltage applied across each inverter 4 and 5 is equivalent to about half the d.c. voltage output by the rectifier 1. Certain variations, however, do occur as a result of the charging and discharging of the appropriate capacitor 8 or 9 in line with the frequency of the inverter. However, those of ordinary skill in the art will appreciate that for the embodiment of the invention illustrated in FIG. 1, each inverter 4 and 5 is only subject to approximately half the d.c. output voltage of rectifier 1 so that semiconductor elements having reduced dielectric ratings may be employed.

Figure 2:
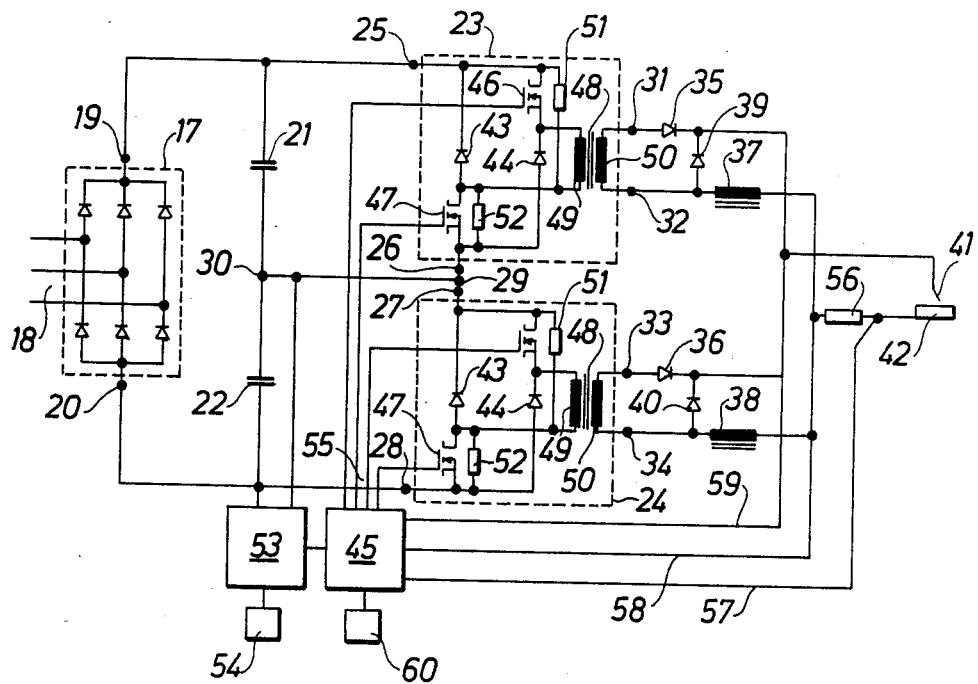
FIG. 2 is a schematic diagram illustrating a modified embodiment of the present invention.

Turning now to FIG. 2, there is shown a schematic diagram setting forth a modified embodiment of the present invention. More particularly, FIG. 2 shows a three-phase rectifier 17 which is connected to a three-phase mains supply 18. The outputs 19 and 20 are connected to two series connected inverters 23 and 24 having designated inputs 25, 26, 27 and 28. The inputs 26 and 27 are connected together via a clip 29, as indicated, and this junction is connected to the junction 30 between the serially connected capacitors 21 and 22.

The outputs 31, 32, 33 and 34 from the inverter 23 and 24 are series connected, respectively, through a diode 35 and 36 to welding inductors 37 and 38, respectively. A free-wheeling diode 39 and 40 takes over the welding current whenever the flow of energy from the inverter is interrupted. The two output circuits formed by the elements 35, 37 and 39 and 36, 38 and 40 are connected in parallel with one another and to an electrode 41 and a workpiece 42.

The inverters 23 and 24 may be of identical construction and, for this reason, each inverter 23 and 24 has been provided with common reference numerals to define common structure and only one of them is described in detail below. The inverter 23 may take the form of an asymmetrical half bridge inverter having two parallel sections. Each section contains a diode 43 and 44 and a semiconductor element 46 and 47 which, as indicated, may take the form of a MOS field effect transistor capable of being controlled by a control device 45.

Unlike an ordinary bipolar transistor, the control current in a MOS field effect transistor may have negligible value. A MOS field effect transistor also exhibits a positive temperature coefficient so that the resistance manifested thereby increases as the temperature increases. For this reason, unlike a bipolar transistor, MOS field effect transistors may be connected directly in parallel circuits without a need for special elements or auxiliary circuits for achieving an even distribution of current to individual semiconductor elements. Further, the positive temperature coefficient exhibited thereby will insure that no current surges will occur since an uncontrollable increase in current in the semiconductor will cause local area temperature rise due to overloading within the overloaded area of the MOS field effect transistor. This in turn will produce a desirable reduction in the current in that area due to an increase in resistance.

The effect is opposite to the normal characteristics exhibited by bipolar transistors since increases in current may occur in conjunction with any local overheating of the semiconductor. This is one of the undesirable characteristics of the bipolar transistor. Thus, MOS field effect transistors exhibit a number of advantageous characteristics making it suitable for use as a controllable connecting element in an inverter. One disadvantage of MOS field effect transistor devices in such configurations is the low dielectric strength exhibited. More particularly, MOS field effect transistors are available at the present time with blocking voltages of up to approximately 800 V. MOS field effect transistor devices having such high dielectric strengths are expensive, however, at the high currents for which the inverters here described must be dimensioned and such ratings are normally required. However, due to the costs involved it is desirable to utilize cheaper MOS field effect transistors with low dielectric strength. This is available with the embodiment of the invention shown in FIG. 2.

Thus, FIG. 2 shows only one MOS field effect transistor connected in series with its diode. However, in view of the high currents which are encountered it is frequently necessary, as a general rule, to assume that several MOS field effect transistors, connected in parallel, are required.

Specifically in FIG. 2, a primary winding 49 of a transformer 48 is connected between the two MOS field effect transistors 46 and 47. Resistances 51 and 52 are connected between one side of the primary of the transformer 48 and the outputs 25, 29 and 29, 28 of the rectifier circuit. The secondary winding 50 of the transformer 48 is connected directly to the outputs 31 and 32 of the inverters 23 and 24 indicated by the dashed block. The series connected resistances 51 and 52 in each of the inverters 23 and 24 have the same voltage dividing function as the resistances 10 and 11 described in conjunction with FIG. 1.

The d.c. voltage applied at the inputs 25, 29 and 29, 28 of each inverter 23 and 24 is divided by each pair of resistances 51 and 52, which may have identical resistivity, into two identical partial voltages as present at inputs 25, 29 and 29, 28. The potential of the input at the conductor connected between junctions 29 and 30 lies theoretically halfway between the potential of the outputs 19 and 20. Small deviations from this value will occur, for example, due to the different pulse lengths associated with the pulse signals applied to the MOS field effect transistors 46 and 47 and the charging currents associated with the capacitors 21 and 22.

The MOS field effect transistors 46 and 47 within the inverters 23 and 24 are thus exposed only to a voltage which is equivalent to a maximum of one-half of the d.c. voltage appearing under operating conditions between the outputs 25, 29 and 29, 28 plus a small additional voltage attributable to the variations in potential at the terminal 29. In the event of a fault, the potential at the terminal 29 may deviate considerably from its specified value with the consequence that the voltage across any of the inverters 23 and 24 will be too great and the MOS field effect transistors will be damaged. An operating condition of this kind may be prevented from occurring by using a special monitoring circuit.

More particularly, in FIG. 2 the voltage across the capacitor 22 is applied to a comparator 53. In the comparator 53, the capacitor voltage is compared with a voltage level which is adjustable by means of a regulator device 54. If the voltage difference across capacitor 22 and the level applied by regulator 54 exceeds a certain value, the comparator 53 will transmit a signal to the control unit 45 which acts via control cables 55 to block the MOS field effect transistors 46 and 47 in the inverters 23 and 24. If the current flow through these transistors is blocked, the voltage will be distributed evenly over the four transistors 46 and 47 and each transistor will be loaded with only one-quarter of the voltage between the rectifier outputs 19 and 20.

When the unloaded power source is connected to the mains, the rectified voltage between the terminals 19, 20 will at the very first moment establish partial voltages across the capacitors 21, 22 which are inversely proportional to their capacitances. Commercially available capacitors exhibit values of capacitance which differ significantly from their prescribed normal values. Therefore, major variations in the partial voltages at the moment of the circuit-closing would often occur unless the time and expense necessary to carefully match the capacitors used for smoothing and dividing the voltages was employed. After a short time the value of the partial voltages is substantially defined by the values of the resistors 51, 52 of each inverter. The undesired uneven distribution of the partial voltages could be harmful for these MOS field effect transistors connected in parallel with the capacitor having the smaller capacitance. However, as the voltage across the capacitor 22 is applied to the comparator 53 the MOS field effect transistors will be blocked and the voltage across one MOS field effect transistor cannot theoretically be greater than one-half of the d.c. voltage if one of the capacitors has been destroyed by breakdown and the resistances of the resistors 51, 52 are equal.

The MOS field effect transistors will be blocked if the voltage across the capacitor 22 is too high or too low. In the latter case the voltage across the capacitor 21 will be too high. It is also thinkable to connect the potential of the terminal 19 to an input of the comparator 53 and to compare the voltages across both capacitors 21, 22 with a predetermined voltage level.

A shunt 56 is used to monitor a voltage representative of the welding current. This voltage, together with the welding voltage provided to the electrode 41 and workpiece 42 is supplied via the cables 57, 58 and 59 to the control unit 45 which is common to the two inverters 23 and 24. A regulator device 60 for the adjustment of a reference value for the welding current and the welding voltage is connected to the control unit 45. Alternatively, each inverter 23 and 24 may be provided with a separate control unit.

The two inverters 23 and 24, illustrated in FIG. 2, are here configured in the form of asymmetrical half bridge inverters which are driven as pulse modulated inverters in a push/pull configuration through the operation of the control unit 45. The inverters 23 and 24 alternately produce at the outputs 31, 32 and 33, 34 voltage pulses having a specific length. With the inverters 23 and 24 loaded in this manner, it has been found to be advantageous, as has been demonstrated, to connect each inverter 23 and 24 in series with a rectifier 35 and 36 and welding inductor 37 and 38 prior to connecting the inverters 23 and 24 in parallel and to the electrode 41 and the workpiece 42.

Although the instant invention has been described in connection with rather specific exemplary embodiments thereof, it will be understood that many modifications and variations shall be readily apparent to those of ordinary skill in the art. Therefore, it is manifestly intended that this invention be only limited by the claims and the equivalents thereof.

What is claimed is:

1. In a power source for arc welding aplications having rectifier means for providing a d.c. output from a.c. mains, smoothing capacitor means for shaping a d.c. output from said rectifier means and an inverter arrangement connected in parallel with said capacitor means for converting said shaped d.c. output into an a.c. voltage having a frequency substantially higher than that provided by said a.c. mains, the improvement comprising:

a plurality of individual inverter means forming said inverter arrangement, each of said plurality of individual inverter means having a pair of inputs, a pair of outputs, and including at least a pair of semiconductive elements, each of said pair of semiconductive elements being connected between one input and one output of said individual inverter means;

means for interconnecting selected inputs to each pair of said plurality of individual inverter means to connect each of said plurality of individual inverter means in said inverter arrangement in series;

control means for controlling the conductivity of a semiconductive element, said control means being connected to said at least said pair of semiconductive elements within each of said plurality of individual inverter means;

transformer means connected across each pair of outputs from each of said plurality of individual inverter means;

a plurality of capacitors forming said smoothing capacitor means, said plurality of capacitors being connected in series, each pair of serially connected capacitors within said plurality of capacitors being connected in parallel to each pair of serially connected individual inverter means within said plurality of individual inverter means, and each of said plurality of capacitors being connected across said pair of inputs to one of said plurality of individual inverter means;

a plurality of pairs of resistor means, each one of said plurality of pairs of resistor means being connected in parallel with one of said plurality of capacitors and an associated one of said plurality of individual inverter means, each resistor means of each of said plurality of pairs of resistor means being connected to a differing one of said pair of inputs to said associated one of said plurality of individual inverter means and to a common one of said pair of outputs thereto; and means for connecting each of said plurality of individual inverter means to a welding station.

2. The improved power source according to claim 1 wherein said plurality of individual inverter means comprise a pair of identical inverters, each of said identical inverters having said at least said pair of semiconductive elements therein controlled by said control means in such manner that said individual inverter means produce at said transformer means voltage pulses which are applied in parallel to said welding station through said means for connecting.

3. The improved power source according to claim 2 wherein said means for connecting comprises a series connected rectifier, a welding inductor and a freewheeling diode associated with each of said plurality of individual inverter means.

4. The improved power source according to claim 3 wherein said at least said pair of semiconductive elements present in each of said plurality of individual inverter means comprise a pair of MOS field effect transistor means.

5. The improved power source according to any of claims 1, 2 or 3 wherein said at least said pair of semiconductive elements present in each of said plurality of individual inverter means comprise MOS field effect transistor means.

6. The improved power source according to claim 2 additionally comprising comparator means for comparing a voltage across one of said pair of identical inverters with a reference voltage and generating an output signal in response to a selected difference therebetween, and means for applying said output signal to said control means, said control means being responsive to said output signal being a predetermined value to block current flow in said semiconductive element.

7. The improved power source according to claim 6 additionally comprising regulator means for varying said reference voltage.

8. The improved power source according to claim 7 wherein said means for connecting comprises a series connected rectifier, a welding inductor and a freewheeling diode associated with each of said plurality of individual inverter means.

9. The improved power source according to claim 8 wherein said at least said pair of semiconductive elements present in each of said plurality of individual inverter means comprise a pair of MOS field effect transistor means.

* * * * *